United States Patent
Lai et al.

(10) Patent No.: US 11,841,319 B2
(45) Date of Patent: Dec. 12, 2023

(54) ELECTRICALLY MODULATED LIGHT SOURCE, NON-DISPERSIVE INFRARED SPECTRUM DETECTION SYSTEM AND METHOD FOR DETECTING GAS USING THE SAME

(71) Applicants: Tsinghua University, Beijing (CN); HON HAI PRECISION INDUSTRY CO., LTD., New Taipei (TW)

(72) Inventors: Li-Wen Lai, Beijing (CN); Peng Liu, Beijing (CN); Duan-Liang Zhou, Beijing (CN); Qun-Qing Li, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 72 days.

(21) Appl. No.: 17/718,475

(22) Filed: Apr. 12, 2022

(65) Prior Publication Data
US 2023/0168189 A1 Jun. 1, 2023

(30) Foreign Application Priority Data
Nov. 26, 2021 (CN) .......................... 202111423708.4

(51) Int. Cl.
*G01N 21/3504* (2014.01)
*G01N 21/359* (2014.01)

(52) U.S. Cl.
CPC ....... *G01N 21/3504* (2013.01); *G01N 21/359* (2013.01); *G01N 2021/3545* (2013.01);
(Continued)

(58) Field of Classification Search
None
See application file for complete search history.

(56) References Cited

U.S. PATENT DOCUMENTS 7,045,108 B2 * 5/2006 Jiang .................. B01J 23/74
423/447.2
8,921,473 B1 * 12/2014 Hyman .................. C08K 3/04
524/495

(Continued)

OTHER PUBLICATIONS

Ning et al. (Multifunctional super-aligned carbon nanotube/polyimide composite film heaters and actuators; Carbon 139 (2018) 1136-1143 (Year: 2018).*

(Continued)

*Primary Examiner* — David P Porta
*Assistant Examiner* — Djura Malevic
(74) *Attorney, Agent, or Firm* — ScienBiziP, P.C.

(57) ABSTRACT

An electrically modulated light source is provided. The electrically modulated light source comprises a carbon nanotube film structure. The electrically modulated light source heats up to a highest temperature and emits thermal radiation in less than 10 milliseconds after a voltage is applied, and the electrically modulated light source cools down to an initial temperature of the electrically modulated light source in less than 10 milliseconds after the voltage is removed. An modulation frequency of the electrically modulated light source is greater than or equal to 150 KHz. A non-dispersive infrared spectrum detection system used the electrically modulated light source, and a method for detecting gas used the electrically modulated light source are also provided.

20 Claims, 17 Drawing Sheets

(52) U.S. Cl.
CPC ............... *G01N 2201/0691* (2013.01); *G01N 2201/06186* (2013.01)

(56) References Cited

U.S. PATENT DOCUMENTS

| | | | | |
|---|---|---|---|---|
| 8,926,933 | B2* | 1/2015 | Zhang | C04B 35/62281 |
| | | | | 977/843 |
| 10,125,022 | B2* | 11/2018 | Misra | C01B 32/168 |
| 11,208,740 | B2* | 12/2021 | Inoue | D02G 3/16 |
| 11,434,581 | B2* | 9/2022 | Schauer | C25F 7/00 |
| 2008/0143230 | A1* | 6/2008 | Rueger | H01J 21/04 |
| | | | | 313/238 |
| 2010/0221852 | A1* | 9/2010 | Li | B82Y 30/00 |
| | | | | 438/22 |
| 2019/0305175 | A1* | 10/2019 | Udrea | H01L 31/03044 |
| 2019/0376940 | A1* | 12/2019 | Debnath | G01N 33/004 |
| 2020/0140278 | A1* | 5/2020 | Wei | C01B 32/168 |
| 2020/0141808 | A1* | 5/2020 | Wang | B82Y 40/00 |
| 2020/0144014 | A1* | 5/2020 | Wei | C09J 201/00 |
| 2020/0386677 | A1* | 12/2020 | Deliwala | G01N 33/004 |
| 2021/0389786 | A1* | 12/2021 | Maccioni | G01N 21/1702 |
| 2023/0168189 | A1* | 6/2023 | Lai | G01N 21/3504 |
| | | | | 250/343 |

OTHER PUBLICATIONS

Wang et al. (High-Performance On-Chip Thermionic Electron Micro-Emitter Arrays Based on Super-Aligned Carbon Nanotube Films;Adv. Funct. Mater. 2020, 30, 1907814) (Year: 2020).*

Hodgkinson et al. (Non-dispersive infra-red (NDIR) measurement of carbon dioxide at 4.2 micro in a compact and optically efficient sensor; Sensors and Actuatorrs B 186 (2013) 580-588) (Year: 2013).*

Guohua et al. (Carbon Nanotube Gas Sensor Based on Corona Discharge;Chin J Anal Chem, 2006, 34(12), 1813-1816.) (Year: 2006).*

* cited by examiner

ELECTRICALLY MODULATED LIGHT SOURCE, NON-DISPERSIVE INFRARED SPECTRUM DETECTION SYSTEM AND METHOD FOR DETECTING GAS USING THE SAME

CROSS-REFERENCE TO RELATED APPLICATIONS

This application claims all benefits accruing under 35 U.S.C. § 119 from China Patent Application No. 202111423708.4, filed on Nov. 26, 2021, in the China Intellectual Property Office, the contents of which are hereby incorporated by reference.

FIELD

The present disclosure relates to an electrically modulated light source, a non-dispersive infrared spectrum detection system using the electrically modulated light source, and a method for detecting gas using the electrically modulated light source.

BACKGROUND

As a global industrialization process gradually matures, a lot of greenhouse gases and even polluted gases are emitted to the environment, the greenhouse gases and polluted gases not only cause a ground temperature to rise, but also pose a threat to human health. Therefore, detecting a content of the greenhouse gases and polluted gases in the environment and taking improvement measures is a major task of environmental protection. General gas systems, especially atmospheric environments, require a real-time quantitative detection; at the same time, a detection system for detecting the gases is required to have features of stable performance, and being able to react quickly and test a tiny content. A non-dispersive infrared (NDIR) spectrum detection instrument meets the features. The NDIR spectrum detection instrument has simple structure and low cost, and a component of the NDIR spectrum detection instrument can be replaced flexibly. The NDIR spectrum detection instrument also has high gas specificity, as long as an absorption spectrum of a gas is detected, a sharp and narrow characteristic absorption peak can be used to directly distinguish a gas type. Therefore, when the gas is detected by the NDIR spectrum detection instrument, there is no gas cross-response; and the gas can be detected in real-time, on-site and even remotely without interfering with the gas sample. Furthermore, an intensity of an incident light can be determined by the NDIR spectrum detection instrument, so a detection performed by the NDIR spectrum detection instrument is self-referenced, and thus the NDIR spectrum detection instrument has high reliability and repeatability.

Modulated light sources are widely used in the NDIR spectrum detection instrument, and the NDIR spectrum detection instrument with the modulated light source has small size, high stability, and high test accuracy. Compared with non-optical detection methods, a NDIR spectrum detection method using the modulated light source has higher sensitivity, selectivity and stability. The NDIR spectrum detection method using the modulated light source has a long service life and short response time, which can realize online real-time detection. Further, performances of the NDIR spectrum detection method using the modulated light source will not deteriorate due to catalyst poisoning, etc. caused by environmental changes or specific gases.

Conventional modulated light sources comprise mechanically modulated light sources, mid-infrared laser light sources, lead salt diode lasers, and nonlinear light sources. However, the mechanically modulated light source requires high mechanical precision and time resolution; and the mechanically modulated light source has slow modulation response, and an optical path is easy to be affected. The mid-infrared laser light sources lack continuous wavelength stability. The lead salt diode lasers have low output power and high cooling requirements. The non-linear light source has complexity and low power. The conventional modulated light sources limit an application of the NDIR spectrum detection instrument.

BRIEF DESCRIPTION OF THE DRAWINGS

Implementations of the present technology will now be described, by way of example only, with reference to the attached figures, wherein.

DETAILED DESCRIPTION

Figure 1:
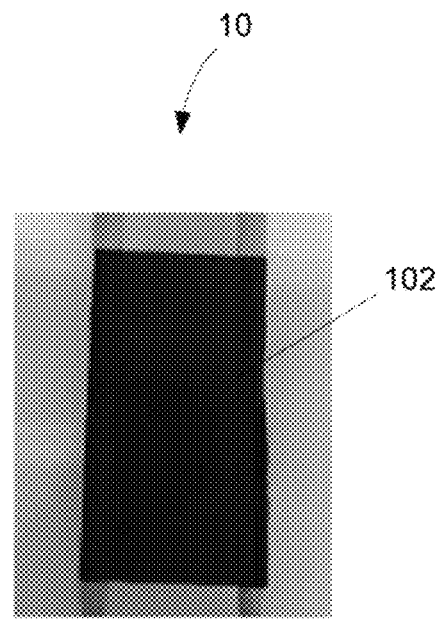
FIG. 1 is a front view of an electrically modulated light source of one embodiment.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like. The term "binary or multi-element metal alloy" in the present disclosure means "binary metal alloy or multi-element metal alloy".

Figure 2:
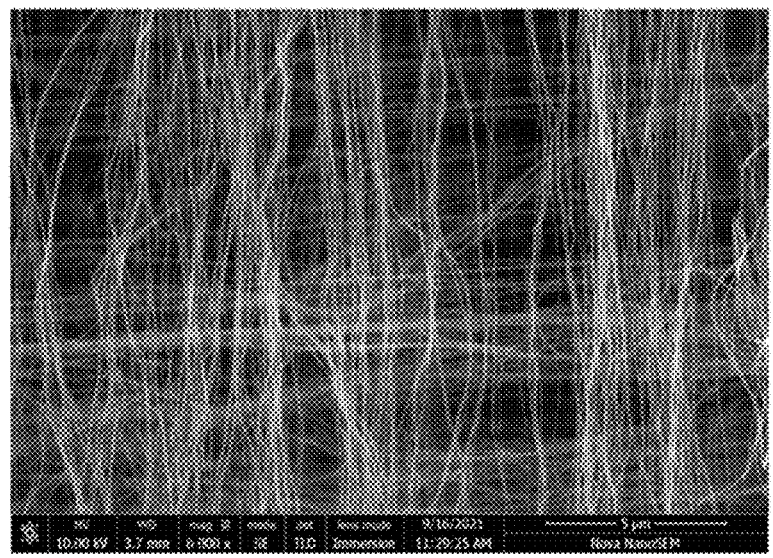
FIG. 2 is an electron microscope photograph of a carbon nanotube film structure of one embodiment.

Referring to FIG. 1 and FIG. 2, one embodiment is described in relation to an electrically modulated light source 10. The electrically modulated light source 10 comprises a carbon nanotube film structure 102. The carbon nanotube film structure 102 comprises a plurality of carbon nanotubes, and the plurality of carbon nanotubes are joined by van der Waals forces. The electrically modulated light source 10 can instantly heat up and emit thermal radiation after a voltage is applied across the electrically modulated light source 10, and can instantly cool down to an initial temperature of the electrically modulated light source 10 after the voltage is removed. The initial temperature refers to a temperature of the electrically modulated light source 10 before the voltage is applied across the electrically modulated light source 10. The "instantly heat up" means that after the voltage is applied to the electrically modulated light source 10, a time taken from the initial temperature to a highest temperature is in millisecond level. The highest temperature refers that after the voltage is applied to the electrically modulated light source 10, the highest temperature that the electrically modulated light source 10 can reach. The "instantly cool down" means that after the applied voltage is removed from the electrically modulated light source 10, a time taken from the highest temperature to the initial temperature is in millisecond level. The "millisecond level" means that the time is less than 10 milliseconds.

The carbon nanotube film structure 102 comprises the plurality of carbon nanotubes, and the plurality of carbon nanotubes are joined by van der Waals forces. The carbon nanotube film structure 102 can be a film suspended on a nickel rod and formed by cutting a plurality of super-aligned carbon nanotube films and stacking the plurality of super-aligned carbon nanotube films vertically for multiple times on the nickel rod. The carbon nanotube film structure 102 can be a structure consists of carbon nanotubes. The carbon nanotube film structure 102 can comprise at least one layer of super-aligned carbon nanotube film. The carbon nanotube film structure 102 can also comprise a plurality of carbon nanotube wires, and the plurality of carbon nanotube wires can be arranged in parallel or crosswise to form the carbon nanotube film structure 102. The carbon nanotube film structure 102 can also comprise a composite structure of at least one layer of super-aligned carbon nanotube film and a plurality of carbon nanotube wires.

In one embodiment, the carbon nanotube film structure 102 comprises a plurality of layers of super-aligned carbon nanotube films, and the plurality of layers of super-aligned carbon nanotube films are stacked with each other. An intersection angle between the carbon nanotubes in adjacent super-aligned carbon nanotube films can be any angle. In one embodiment, the intersection angle is 90 degrees, and the carbon nanotube film structure 102 is stable and not easily damaged. In one embodiment, the carbon nanotube film structure 102 comprises ten layers of super-aligned carbon nanotube films stacked with each other, and the intersection angle between the carbon nanotubes in adjacent super-aligned carbon nanotube films is 90 degrees; a surface of the carbon nanotube film structure 102 is uniform, and the carbon nanotube film structure 102 is firm after atomization. In one embodiment, the electrically modulated light source 10 comprises the carbon nanotube film structure 102, the carbon nanotube film structure 102 comprises 10 layers of super-aligned carbon nanotube films stacked with each other, and the intersection angle between the carbon nanotubes in adjacent super-aligned carbon nanotube films is 90 degrees. In one embodiment, the electrically modulated light source 10 consists of the carbon nanotube film structure 102, and the carbon nanotube film structure 102 consists of the plurality of super-aligned carbon nanotube films, the plurality of carbon nanotube wires, or a composite structure of at least one layer of super-aligned carbon nanotube film and the plurality of carbon nanotubes wires.

The super-aligned carbon nanotube film comprises a plurality of carbon nanotubes, a large number of the plurality of carbon nanotubes in the super-aligned carbon nanotube film can be oriented along a preferred orientation, meaning that a majority of carbon nanotubes in the super-aligned carbon nanotube film extends along a same direction. Extending directions of the plurality of carbon nanotubes are substantially parallel to a surface of the super-aligned carbon nanotube film. Of course, a minority of carbon nanotubes in the super-aligned carbon nanotube film may be randomly aligned. However, the number of randomly aligned carbon nanotubes is very small and does not affect the overall oriented alignment of the majority of carbon nanotubes in the super-aligned carbon nanotube film. Therefore, there may be partial contact between juxtaposed carbon nanotubes in the majority of carbon nanotubes extending in the same direction in the super-aligned carbon nanotube film.

A method for making the super-aligned carbon nanotube film comprises:

First, a super-aligned carbon nanotube array is provided, and the super-aligned carbon nanotube array is formed on a surface of a substrate. The super-aligned carbon nanotube array comprises a plurality of carbon nanotubes, and the plurality of carbon nanotubes are substantially parallel to each other and perpendicular to the surface of the substrate. The super-aligned carbon nanotube array is substantially free with impurities, such as amorphous carbon or residual catalyst metal particles. Examples of the method for making the carbon nanotube array is taught by U.S. Pat. No. 7,045,108 to Jiang et al.

Second, a carbon nanotube segment with a certain width from the super-aligned carbon nanotube array is selected by a stretching tool, in one embodiment, the carbon nanotube segment with the certain width is selected by contacting the super-aligned carbon nanotube array via a tape or an adhesive strip with a certain width. The carbon nanotube segment with the certain width is drawn in a direction being substantially perpendicular to a growth direction of the super-aligned carbon nanotube array. Thereby, a continuous super-aligned carbon nanotube film comprising a plurality of carbon nanotubes joined end to end is formed. Arrangement directions of the plurality of carbon nanotubes of the super-aligned carbon nanotube film are substantially parallel to a drawing direction of the super-aligned carbon nanotube film.

In one embodiment, the carbon nanotube film structure 102 comprises the plurality of carbon nanotube wires, adjacent carbon nanotube wires are joined by van der Waals force. The carbon nanotube wire can be an untwisted carbon nanotube wire or a twisted carbon nanotube wire.

The untwisted carbon nanotube wire comprises a plurality of carbon nanotubes substantially oriented along a length of the untwisted carbon nanotube wire. The untwisted carbon nanotube wire can be formed by treating a drawn carbon nanotube film with a volatile organic solvent. Examples of the untwisted carbon nanotube wire and a method for making the same are taught by U.S. Pat. No. 7,045,108 to Jiang et al.

The twisted carbon nanotube wire comprises a plurality of carbon nanotubes spirally arranged along an axial direction of the twisted carbon nanotube wire. The twisted carbon nanotube wire is formed by twisting a carbon nanotube film. In one embodiment, the twisted carbon nanotube wire is treated by applying an organic solvent to the carbon nanotube film. Examples of the twisted carbon nanotube wire and a method for making the same are taught by U.S. Pat. No. 8,602,765 to Jiang et al.

The super-aligned carbon nanotube film can be prepared in a large area; a radiant energy distribution of the super-aligned carbon nanotube film can be changed and optical signals with different frequencies can be obtained by changing a size of the carbon nanotube film structure, a number of layers of the super-aligned carbon nanotube film, and a size or frequency of an applied voltage. Therefore, the carbon nanotube film structure 102 has flexible tunability as an electrically modulated light source. Furthermore, in a vacuum environment, after a voltage is applied to the carbon nanotube film structure 102, when a temperature of the carbon nanotube film structure 102 reaches a certain level, the carbon nanotube film structure 102 starts to radiate visible light. For example, in a vacuum environment within 10 Pa, when the applied voltage is 20V, the temperature of the super-aligned carbon nanotube film can reach about 1500K.

Figure 3:
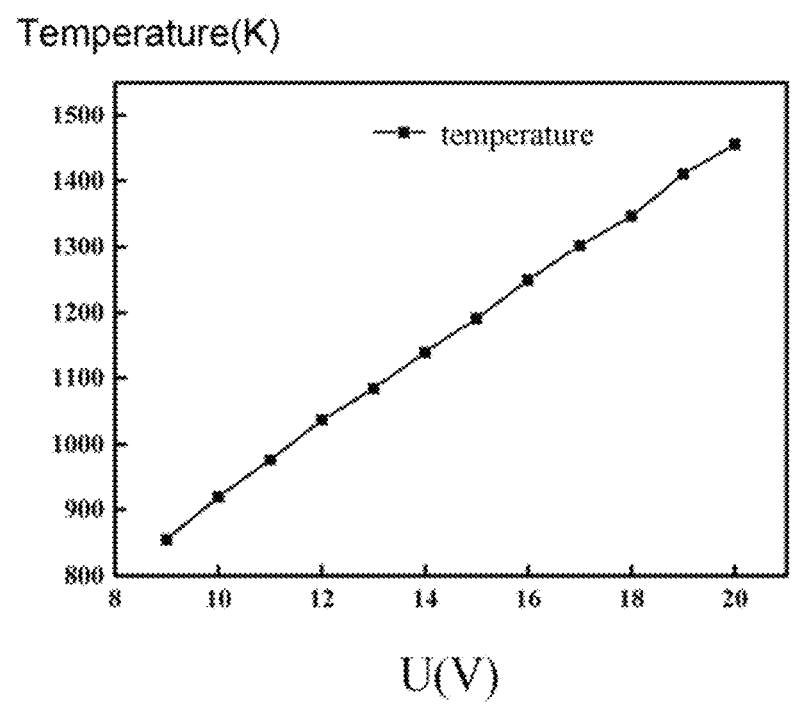
FIG. 3 is a change curve of a temperature of the carbon nanotube film structure with an applied voltage.

Referring to FIG. 3, in the vacuum environment, a pulsed square wave voltage is applied to both ends of the carbon nanotube film structure 102, and the pulse square wave voltage is changed. A surface temperature of the carbon nanotube film structure 102 increases with an increase of the applied voltage, therefore, the radiation properties of the carbon nanotube film structure 102 can be modulated. FIG. 3 further illustrates that the electrically modulated light source 10 can reach different temperatures by loading different voltages. Therefore, a radiation power can be adjusted only by adjusting the loading voltage of the electrically modulated light source 10, and the electrically modulated light source 10 has flexible adjustability.

Figure 4:
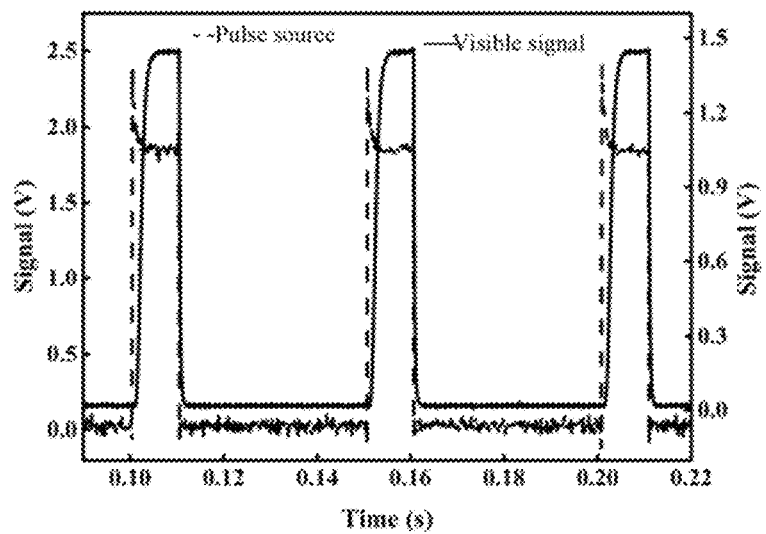
FIG. 4 shows during a time domain analysis, a signal curve in 200 nm-1100 nm of a response of the carbon nanotube film structure to a pulse voltage obtained in an oscilloscope, and the signal curve is obtained by using a Si detector; and an actual loading voltage is 10 times a peak value of the pulse voltage in the FIG. 4.
Figure 5:
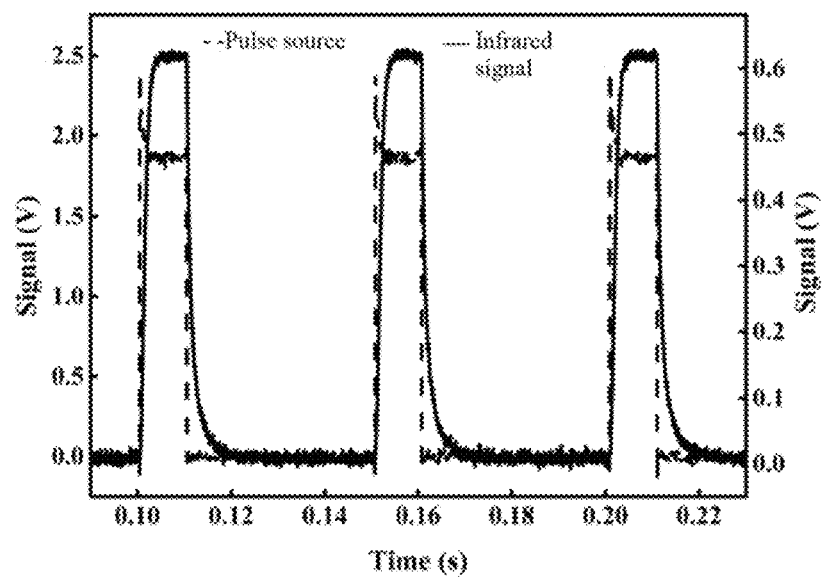
FIG. 5 shows during the time domain analysis, a signal curve in 2.0 μm-10.6 μm of a response of the carbon nanotube film structure to a pulse voltage obtained in the oscilloscope, and the signal curve is obtained by using a mercury cadmium telluride (MCT) detector; and an actual loading voltage is 10 times a peak value of the pulse voltage in the FIG. 5.

FIG. 4 and FIG. 5 show during a time domain analysis, a response of the carbon nanotube film structure 102 to the pulse voltage obtained in an oscilloscope, FIG. 4 is detected by a silicon (Si) detector, and FIG. 5 is detected by a mercury cadmium telluride (MCT) detector. During the time domain analysis in FIG. 4 and FIG. 5, a pulse amplitude is 20V, a modulation frequency is 20 Hz, and a temperature of the light source reaches 1182° C. It can be seen that from FIG. 4 and FIG. 5, a signal collected by the Si detector in a visible light band and a signal collected by the MCT detector in an infrared light band are synchronized with a signal of the square wave pulse. FIG. 4 and FIG. 5 illustrate that after the carbon nanotube film structure 102 is loaded with the voltage, the temperature of the carbon nanotube film structure 102 rises instantly and radiates outward, and the radiated energy can be successfully detected by the Si detector and the MCT detector. Therefore, the carbon nanotube film structure 102 can be used as a modulated visible and infrared light source.

Figure 6:
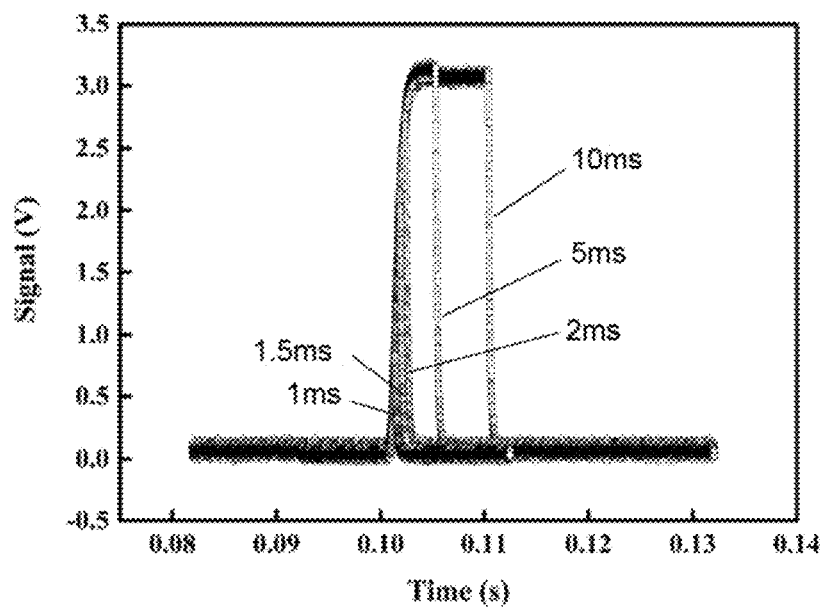
FIG. 6 shows signals obtained by the Si detector under square wave voltage modulation with different pulse widths.
Figure 7:
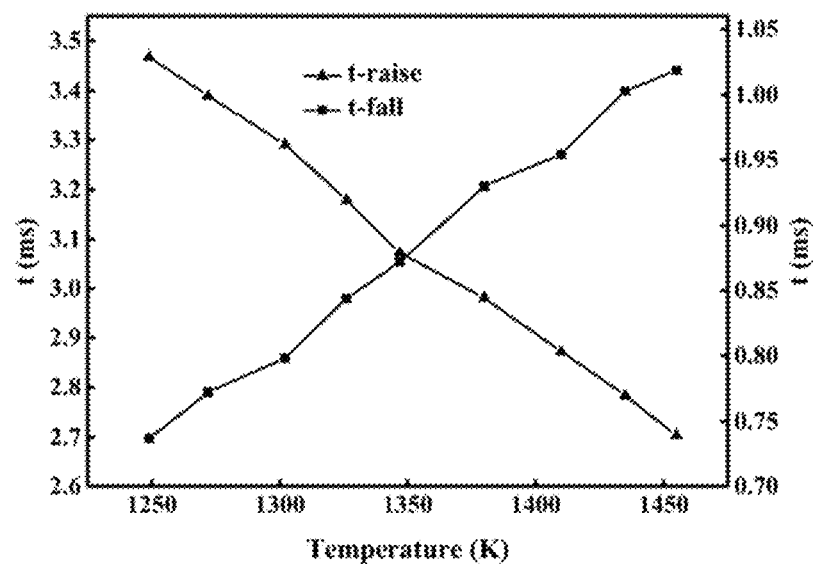
FIG. 7 shows change curves of a rise time and a fall time of the carbon nanotube film structure with temperature in a visible to near-infrared band obtained by the Si detector.
Figure 8:
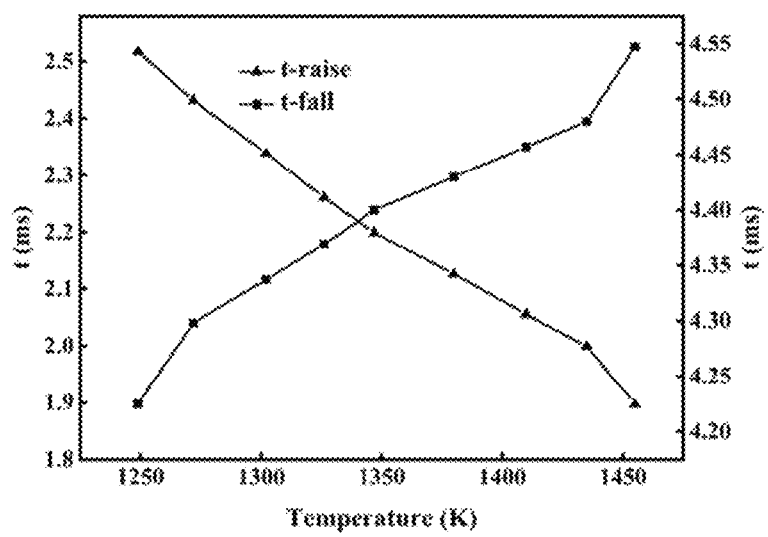
FIG. 8 shows change curves of a rise time and a fall time of the carbon nanotube film structure with temperature in a near-infrared to mid-infrared light band obtained by the MCT detector.
Figure 9:
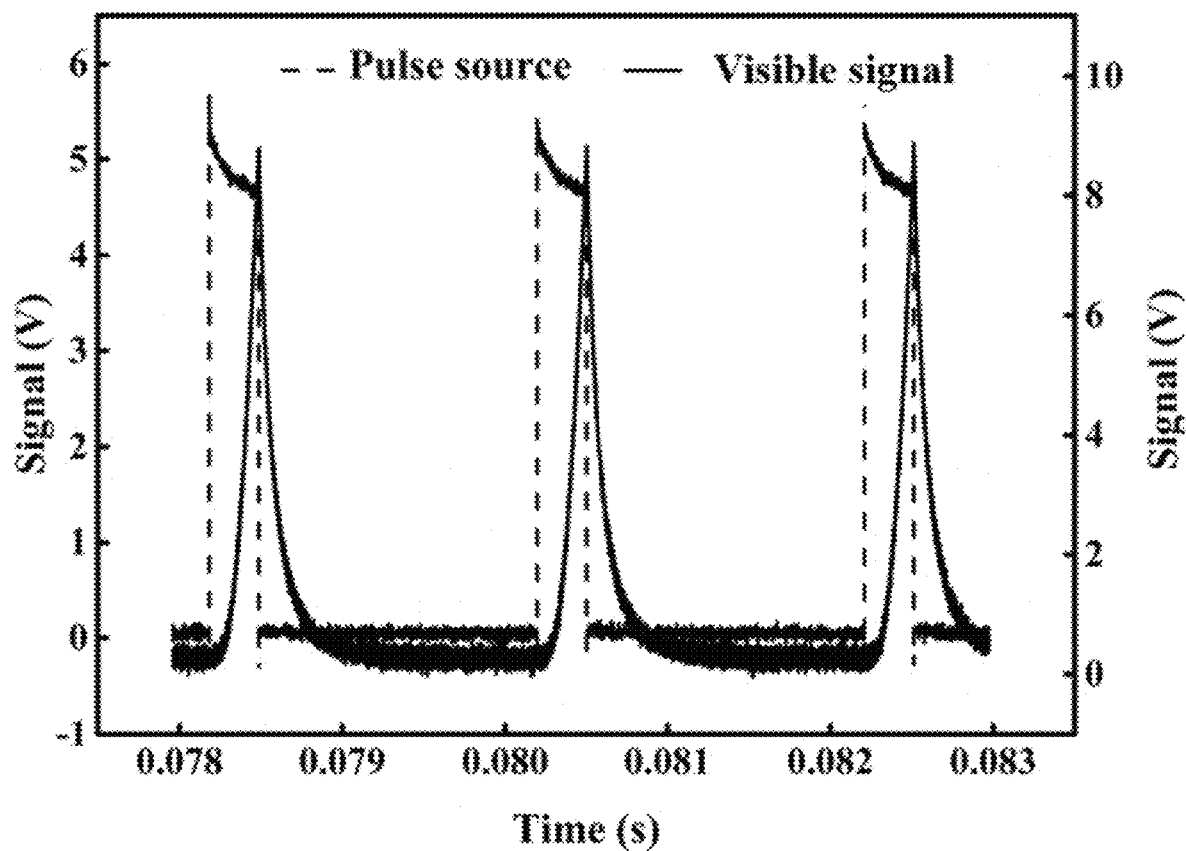
FIG. 9 is a change curve of a signal of the carbon nanotube film structure with time in the visible to near-infrared light band under modulation frequencies of 500 Hz, and an actual loading voltage is 10 times a peak value of a pulse voltage in the FIG. 9.
Figure 10:
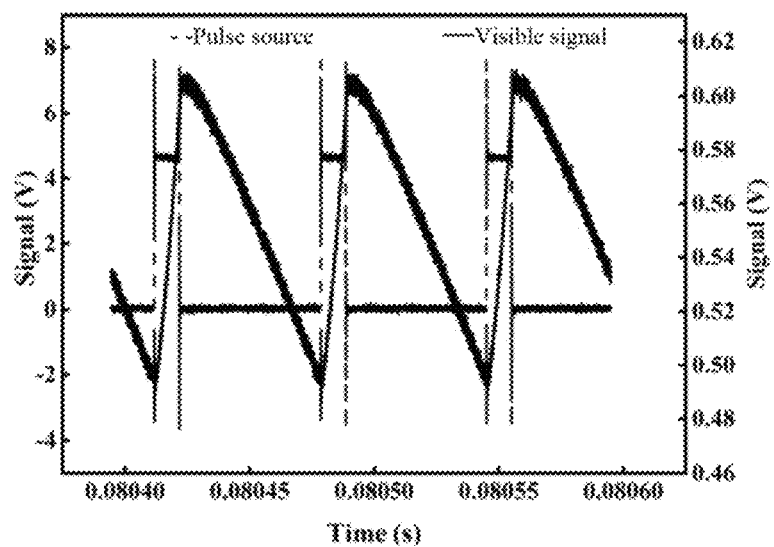
FIG. 10 is a change curve of a signal of the carbon nanotube film structure with time in the visible to near-infrared light band under modulation frequencies of 30 KHz, and an actual loading voltage is 10 times a peak value of the pulse voltage in the FIG. 10.
Figure 11:
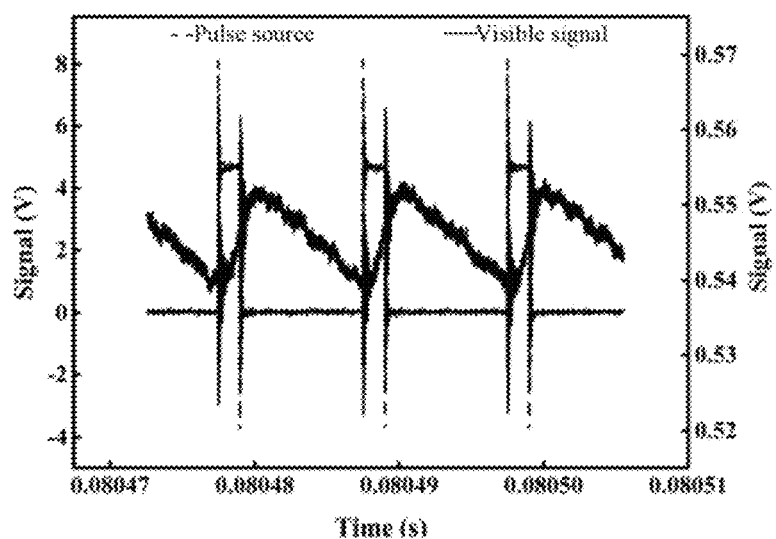
FIG. 11 is a change curve of a signal of the carbon nanotube film structure with time in the visible to near-infrared light band under modulation frequencies of 100 KHz, and an actual loading voltage is 10 times a peak value of the pulse voltage in the FIG. 11.

FIG. 6 shows when the modulation frequency is 20 Hz, the signals from visible band to near-infrared band obtained by the Si detector under square wave voltage modulation with different pulse widths. FIG. 7 shows change curves of a rise time and a fall time of the carbon nanotube film structure 102 with temperature obtained by the Si detector. It can be seen that from FIG. 6 and FIG. 7, in a temperature range of 800° C. to 1200° C. and in the visible to near-infrared band, the rise time of the carbon nanotube film structure 102 is 3 milliseconds (ms) to 4 ms, and the fall time is only 1 ms or even 600 microseconds (μs). FIG. 8 shows change curves of a rise time and a fall time of the carbon nanotube film structure 102 with temperature obtained by the MCT detector in the infrared light band. It can be seen that from FIG. 8, in the temperature range of 800° C. to 1200° C., and in the infrared light band, the rise time of the carbon nanotube film structure 102 is 2 ms to 3 ms, and the fall time is about 5 ms. It can be seen that from FIG. 6-FIG. 8, the carbon nanotube film structure 102 can instantly heat up and emit thermal radiation after the voltage is applied, and can be cooled to the initial temperature instantly after the voltage is removed; the rise time of the carbon nanotube film structure 102 after power-on and the fall time after power-off are both in millisecond level. Therefore, the electrically modulated light source 10 can be quickly modulated, and the carbon nanotube film structure 102 can radiate a time-periodic optical signal synchronized with the modulation signal after the pulse voltage is applied.

FIG. 9-FIG. 12 are change curves of the signal of the carbon nanotube film structure 102 with time in the visible to near-infrared light band under modulation frequencies of 500 Hz, 30 KHz, 100 KHz and 150 KHz, respectively. It can be seen that from the modulation results of different modulation frequencies in FIG. 9-FIG. 12, in the visible light band, an electrical modulation frequency of the carbon nanotube film structure 102 can reach 150 KHz, which illustrates that a modulation frequency of the electrically modulated light source 10 can reach 150 KHz or even above.

The electrically modulated light source 10 of the present invention has a wide range of applications. For example, the electrically modulated light source 10 can be as a high-frequency modulated light source to replace optical detection methods that require mechanical modulation such as choppers. The electrically modulated light source 10 can be used for gas detection in non-dispersive infrared spectroscopy detection method. The electrically modulated light source 10 can also be used as a light source of Fourier infrared spectrometer or other occasions to test the properties of samples, such as absorption spectrum, transmission and reflection, etc.

The electrically modulated light source provided by the present invention has the following advantages:

The electrically modulated light source comprises the carbon nanotube film structure, the carbon nanotube film structure can radiate a wide spectrum, and the radiation power of the carbon nanotube film structure can be increased by increasing the voltage loaded to the carbon nanotube film structure or increasing the number of layers and a length of the super-aligned carbon nanotube film in the carbon nanotube film structure. Therefore, the electrically modulated light source has flexible adjustability and simple operation, and does not affect the optical path.

The modulation frequency of the electrically modulated light source can reach greater than or equal to 150 KHz, the electrically modulated light source can quickly heat up and cool down in a few milliseconds or even hundreds of microseconds, and the modulation response is relatively fast.

The electrically modulated light source is the carbon nanotube film structure, a preparation process of the carbon nanotube film structure is very simple, and the carbon nanotube film structure can be quickly prepared in a large area. The performance of the carbon nanotube film structure is stable and easy to store, and the carbon nanotube film structure has low cost. Therefore, the electrically modulated light source can be large in size; a variety of different gases can be tested by using multiple narrow-band filters with different wavelengths; and electrically modulated light sources that meet the needs of different wavebands can be constructed by using filters of different wavebands.

The carbon nanotube film structure can reach a very high temperature in the vacuum, and the electric modulation frequency of the electric modulation light source can reach 150 KHz or more than 150 KHz, which cannot be achieved by conventional large-size electric modulation light source.

Figure 13:
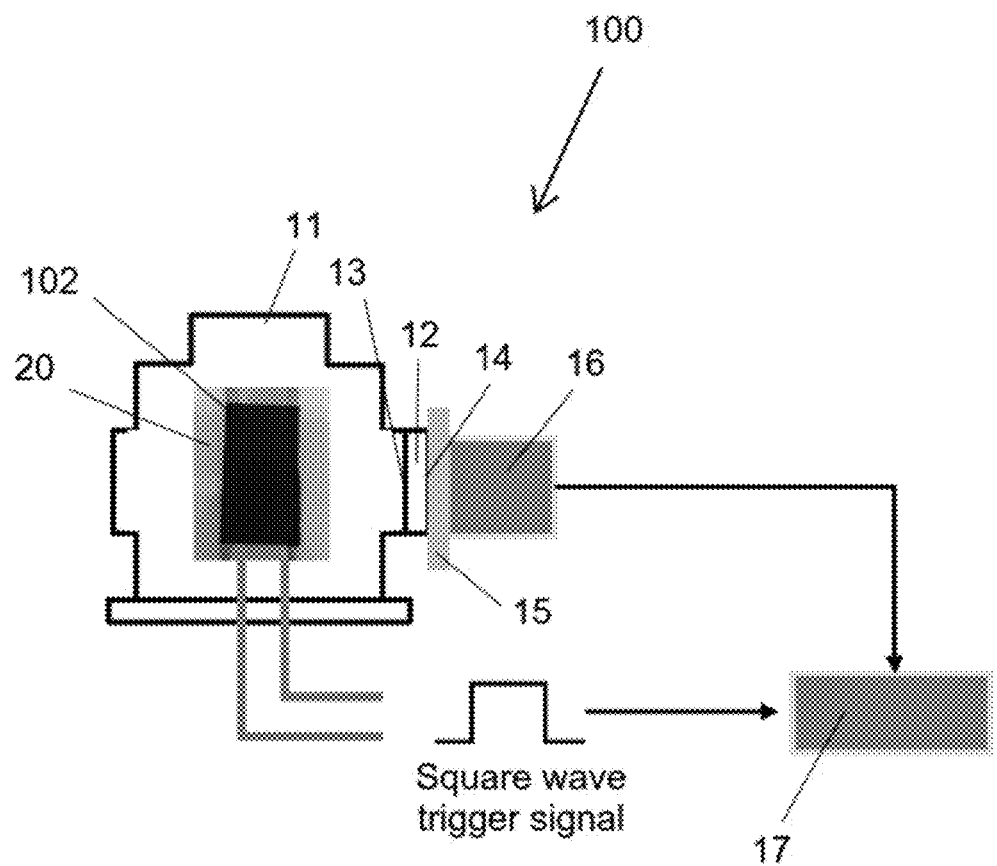
FIG. 13 is a schematic structural diagram of a non-dispersive infrared spectrum detection system of one embodiment.

Referring to FIG. 13, one embodiment is described in relation to a non-dispersive infrared spectrum detection system 100. The non-dispersive infrared spectrum detection system 100 comprises an electrically modulated light source 20, a vacuum chamber 11, a gas chamber 12, a first window piece 13, a second window piece 14, a narrow bandpass filter 15, and a detector 16. The electrically modulated light source 20 is located in the vacuum chamber 11. The vacuum chamber 11 comprises a window, and the first window piece 13 is fixed at the window. The gas chamber 12 is directly connected to the first window piece 13, and the electrically modulated light source 20 is isolated from a gas in the gas chamber 12. A side of the gas chamber 12 at the first window piece 13 is defined as a first side, and a side of the gas chamber 12 opposite to the first side is defined as a second side. The second window piece 14 is fixed on the second side of the gas chamber 12. An optical signal radiated by the electrically modulated light source 10 is detected by the detector 16 after sequentially passing through the first window piece 13, the gas chamber 12, the second window piece 14, and the narrow bandpass filter 15.

Figure 14:
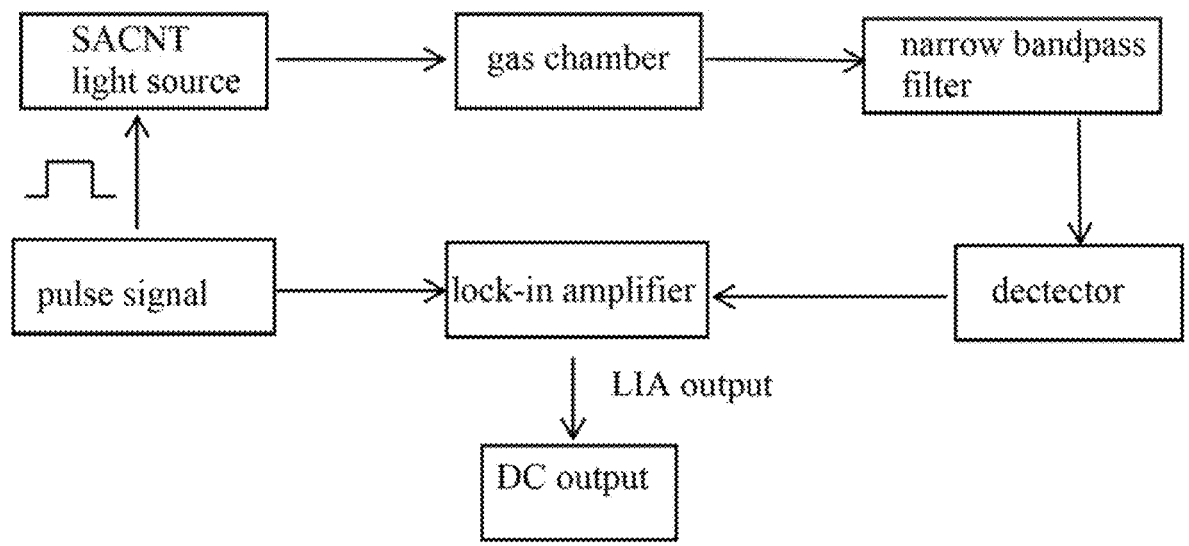
FIG. 14 is a basic route diagram for gas detection by the non-dispersive infrared spectrum detection system in FIG. 13.

Lights pass through the narrow bandpass filter 15 is compressed to a very narrow waveband, and thus a signal detected by the detector 16 is much smaller than an optical signal of a full spectrum radiated by the electrically modulated light source 20. The non-dispersive infrared spectrum detection system 100 can further comprise a lock-in amplifier 17. Referring to FIG. 14, a square wave pulse power signal is input to the lock-in amplifier 17 as a reference signal, and the signal received on the detector 16 is also input to the lock-in amplifier 17, thereby filtering and amplifying the signal and improving a signal-to-noise ratio. The lock-in amplifier 17 can be further connected to a display panel, and a signal in the lock-in amplifier 17 is output to the display panel.

The electrically modulated light source 20 is the same as the electrically modulated light source 10 above. The electrically modulated light source 20 comprises all technical features of the electrically modulated light source 10 above, and in order to save space, it will not be repeated here.

The gas chamber 12 comprises two vent holes in a direction perpendicular to a light path, and the two vent holes are used for entering a gas to be detected and exhausting.

The first window piece 13 and the second window piece 14 can be commonly used infrared windows. For example, potassium bromide window pieces, calcium fluoride window pieces, zinc selenide window pieces, barium fluoride window pieces, magnesium fluoride window pieces, zinc sulfide window pieces, infrared quartz plate pieces, gallium fluoride window pieces. In one embodiment, the first window piece 13 and the second window piece 14 are both calcium fluoride ($CaF_2$) window piece.

The narrow bandpass filter 15 is located outside the gas chamber 12 and is spaced apart from the gas chamber 12. The narrow bandpass filter 15 can be fixed on the detector 16. A center wavelength of the narrow bandpass filter 15 is selected according to a characteristic absorption wavelength of the gas to be detected in the infrared band. For example, a characteristic absorption wavelength of $CO_2$ in infrared band is 4.26 μm, when detecting $CO_2$ gas, the narrow bandpass filter 15 is a filter with a center wavelength of 4.26 μm, and a full width at half maximum of the narrow bandpass filter 15 is 105 nm. When detecting $CH_4$ gas, the narrow bandpass filter 15 is a filter with a center wavelength of 3.33 μm, and the full width at half maximum of the narrow bandpass filter 15 is only 150 nm.

The detector 16 is located behind the narrow bandpass filter 15, and thus the signal received by the detector 16 is an infrared signal consistent with a working wavelength range of the narrow bandpass filter 15. In one embodiment, the detector 16 is the MCT detector, and a range of the MCT detector is 2.0 μm to 10.6 μm.

One embodiment is described in relation to a method for detecting gas using the non-dispersive infrared spectrum detection system 100, the method comprises:

Step (S1): providing the non-dispersive infrared spectrum detection system 100;

Step (S2): injecting the gas to be detected into the gas chamber 12 through the vent holes; and Step (S3): applying a voltage to the electrically modulated light source 10, to make the electrically modulated light source 10 emit thermal radiation, and the optical signal radiated by the electrically modulated light source 10 is detected by the detector 16 after sequentially passing through the first window piece 13, the gas chamber 12, the second window piece 14, and the narrow bandpass filter 15.

In step (S2), the gas to be detected can be a single gas or a mixed gas. During detecting, an inert gas can be further input into the gas chamber 12 as a carrier gas for the gas to be detected.

In step (S3), a wavelength range detected by the detector 16 is narrow, compared with the full-spectrum light energy radiated by the electrically modulated light source 10, the infrared energy in the working range of the filter will be greatly reduced. Therefore, it is necessary to modulate the electrically modulated light source 10; and filter and amplify the detected signal. In one embodiment, step S3 further comprises a step of inputting a square wave pulse power signal to the lock-in amplifier 17 as the reference signal, and inputting the optical signal received on the detector 16 to the lock-in amplifier 17, thereby filtering and amplifying the signal and improving a signal-to-noise ratio. In one embodiment, a 67 Hz square wave pulse power TTL level signal is input to the lock-in amplifier 17 as the reference signal, and a same frequency signal is used to load on the electrically modulated light source 10 at the same time.

The following specific embodiments are used to further illustrate the method for detecting different gases by using the non-dispersive infrared spectroscopy detection system 100.

Example 1: Detecting a Single Target Gas of $CO_2$

Ar and $CO_2$ are introduced into the gas chamber, and a volume ratio of $CO_2$ is changed by changing a flow rate of Ar and $CO_2$, thereby changing an absorption of $CO_2$ to the infrared radiation of the carbon nanotube film structure. A 67 Hz square wave pulse power supply signal is input to the lock-in amplifier as the reference signal, and the signal received on a photodetector is also input to the lock-in amplifier, thereby filtering and amplification of the signal and improving the signal-to-noise ratio.

Example 2: Detecting a Single Target Gas of $CH_4$

A detection method in this embodiment is the same as that in embodiment 1, except that $CO_2$ is replaced with $CH_4$, and the narrow bandpass filter is replaced with the narrow bandpass filter corresponding to $CH_4$.

Example 3: Detecting a Mixed Target Gas of $CO_2$ and $CH_4$

A detection method in this embodiment is the same as that in embodiment 1, except that $CO_2$ is replaced with the mixed target gas of $CO_2$ and $CH_4$, and the narrow bandpass filter is different, and a corresponding narrow bandpass filter is used instead.

A stability of the non-dispersive infrared spectrum detection system 100 is further analyzed. An analysis method comprises: a signal of a narrow band other than the absorption band of $CO_2$ and $CH_4$ is detected; that is, a reference filter with a center wavelength outside the absorption band of $CO_2$ and $CH_4$ is selected to monitor the electrical signal obtained by the system. During the detecting, a filter with a center wavelength of 2.33 μm is used as the reference filter to record a fluctuation of the light source signal, and the full width at half maximum is only 50 nm. Since the accuracy of the lock-in amplifier is 0.0001 mV, the non-dispersive infrared spectrum detection system 100 can quickly accurately reflect the signal after the gas concentration changes.

Figure 12:
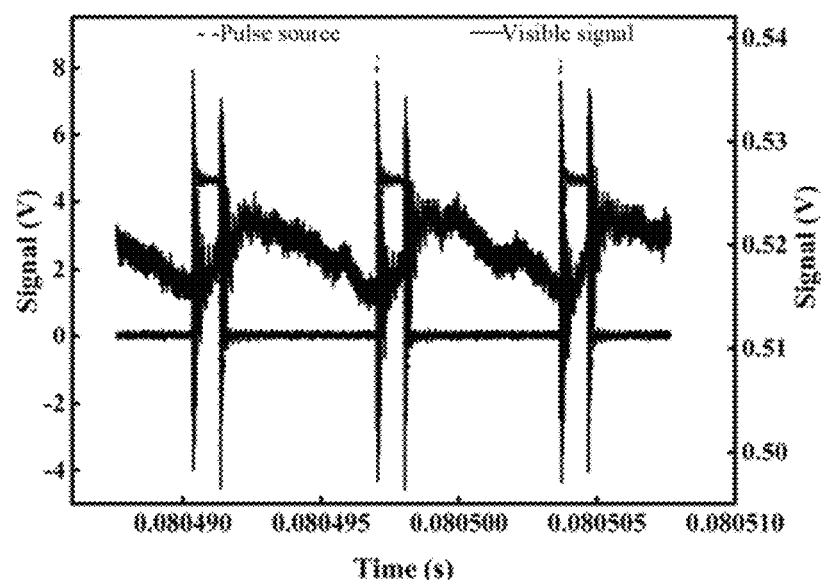
FIG. 12 is a change curve of a signal of the carbon nanotube film structure with time in the visible to near-infrared light band under modulation frequencies of 150 KHz, and an actual loading voltage is 10 times a peak value of the pulse voltage in the FIG. 12.

FIG. 14 shows change curves of a signal strength with the flow rate ratio of $CO_2$ of Example 1 and Example 3 respectively, and the signal strength is a ratio of a signal value to a signal value when the gas chamber is full of Ar gas. It can be seen that from FIG. 12, the signal strength decreases as the concentration of the target gas $CO_2$ increases. A result of the single target gas of $CO_2$ detected in Example 1 is in good agreement with a result of the mixed target gas of $CO_2$ and $CH_4$ detected in Example 3, and the two results are almost equal. FIG. 12 illustrates that the result of detecting $CO_2$ gas using the non-dispersive infrared spectrum detection system 100 is repeatable and stable.

Figure 15:
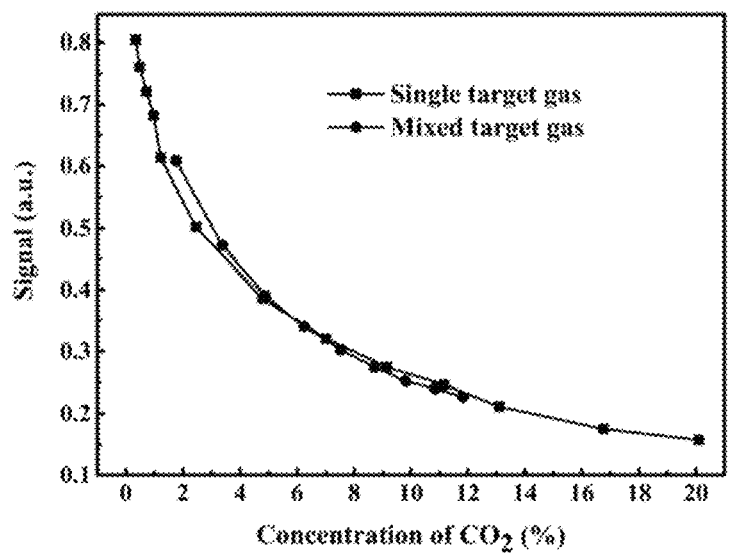
FIG. 15 shows when carbon dioxide ($CO_2$) is used as a target gas, change curves of a relative signal intensity of a narrow bandpass filter with a center wavelength of 4.26 um with a flow rate of $CO_2$ in single target gas test and mixed target gas test.

FIG. 15 shows change curves of a signal strength with the flow rate ratio of $CH_4$ of Example 2 and Example 3 respectively, and the signal strength is a ratio of a signal value to the signal value when the gas chamber is full of Ar gas. It can be seen that from FIG. 13, the signal strength decreases as the concentration of the target gas $CH_4$ increases. A result of the single target gas of $CH_4$ detected in Example 2 is in good agreement with a result of the mixed target gas of $CO_2$ and $CH_4$ detected in Example 3, and the two results are almost equal. FIG. 15 illustrates that the result of detecting $CH_4$ gas using the non-dispersive infrared spectrum detection system 100 is repeatable and stable.

Figure 16:
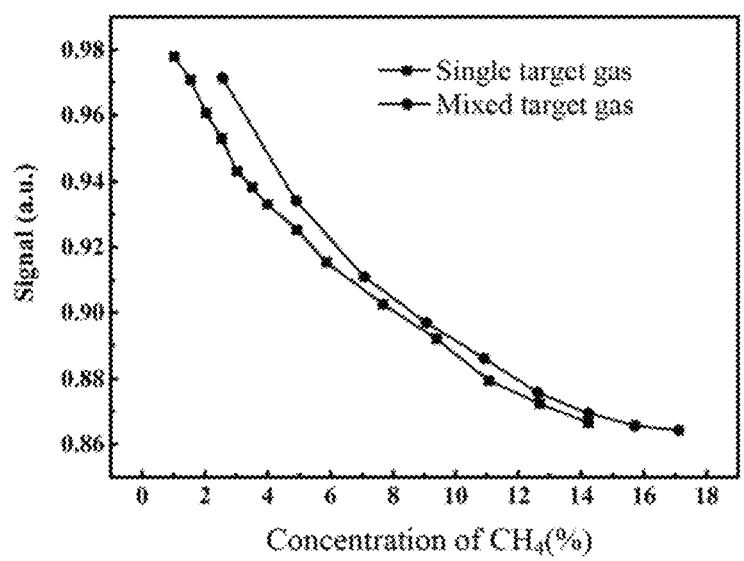
FIG. 16 shows when methane ($CH_4$) is used as a target gas, change curves of a relative signal intensity of a narrow bandpass filter with a center wavelength of 3.33 um with a flow rate of $CH_4$ in single target gas test and mixed target gas test.
Figure 17:
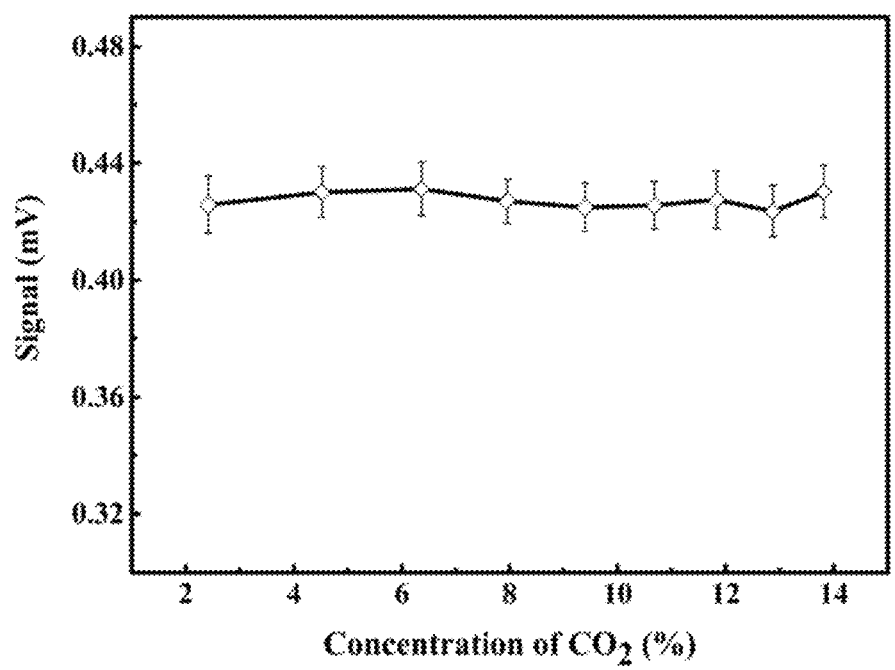
FIG. 17 shows when a mixed target gas of $CO_2$ and $CH_4$ is tested, a change curve of a signal after being filtered by a reference narrow bandpass filter with a center wavelength of 2.33 um with signal values of different $CO_2$ concentrations.

FIG. 16 shows a signal detected by the reference filter in Example 3. It can be seen from FIG. 16, the signal detected by the reference filter in Example 3 is very stable, and that is, a signal value of a very narrow infrared band that is not within the absorption band of the target gas is very stable. FIG. 16 illustrates that the radiated signal of the carbon nanotube film structure is very stable under heating, and the non-dispersive infrared spectrum detection system 10 is also stable, reliable, and highly repeatable.

It can be seen from the gas detection results that as long as the gas flow rate ratio is sufficiently dense, any ratio of $CO_2$ and $CH_4$ can be inferred from its signal curve. In addition, the gas is changed to other types of gas, such as NO, $NO_2$, $NH_3$, $SO_2$, as long as using a narrow-band filter with a working wavelength containing an absorption peak corresponding to the gas, the gas can be analyzed, and the type of the gas contained in the mixed gas can be distinguished and its concentration can be obtained. The non-dispersive infrared spectrum detection system 100 is not limited to detect the gases in Example 1, Example 2 and Example 3. The non-dispersive infrared spectrum detection system 100 can also detect $N_2O$, CO, $SO_2$, $NH_3$, ethanol, benzene and other compounds and other volatile organic compounds.

The non-dispersive infrared spectrum detection system provided by the present invention has the following advantages:

The non-dispersive infrared spectrum detection system comprises the electrically modulated light source comprising the carbon nanotube film structure, the carbon nanotube film structure can radiate a wide spectrum, and the radiation power of the carbon nanotube film structure can be increased by increasing the voltage loaded to the carbon nanotube film structure or increasing the number of layers and the length of the super-aligned carbon nanotube film in the carbon nanotube film structure. Therefore, the electrically modulated light source has flexible adjustability, simple operation and does not affect the optical path.

A modulation frequency of the electrically modulated light source can reach greater than or equal to 150 KHz, the electrically modulated light source can quickly heat up and cool down in a few millisecond or even hundreds of microseconds, and the modulation response is relatively fast.

The non-dispersive infrared spectrum detection system can change its radiation performance only by applying voltage to the electrically modulated light source. The non-dispersive infrared spectrum detection system has no mechanical modulation part, and the modulation response is all determined by the carbon nanotube film structure, which is simple to operate and does not affect the optical path.

The electrically modulated light source is the carbon nanotube film structure, a preparation process of the carbon nanotube film structure is very simple, and the carbon nanotube film structure can be quickly prepared in large area. The performance of the carbon nanotube film structure is stable and easy to store, and the carbon nanotube film structure has low cost. Therefore, the electrically modulated light source can be large in size; the non-dispersive infrared spectrum detection system can detect multiple gases at the same time by using multiple filters of different wavelengths. The carbon nanotube film structure can reach a very high temperature in the vacuum It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. An electrically modulated light source, comprising:
a carbon nanotube film structure, wherein the electrically modulated light source is capable of heating up to a highest temperature to emit a thermal radiation in less than 10 milliseconds after a voltage is applied, and the electrically modulated light source is capable of cooling down to an initial temperature of the electrically modulated light source in less than 10 milliseconds after the voltage is removed; and an modulation frequency of the electrically modulated light source is greater than or equal to 150 KHz.

2. The electrically modulated light source of claim 1, wherein the carbon nanotube film structure comprises at least one layer of super-aligned carbon nanotube film.

3. The electrically modulated light source of claim 2, wherein the carbon nanotube film structure comprises a plurality of layers of super-aligned carbon nanotube films, and the plurality of layers of super-aligned carbon nanotube films are stacked with each other.

4. The electrically modulated light source of claim 3, wherein an intersection angle between carbon nanotubes in adjacent super-aligned carbon nanotube films is 90 degrees.

5. The electrically modulated light source of claim 1, wherein the carbon nanotube film structure comprises a plurality of carbon nanotube wires, and the plurality of carbon nanotube wires are arranged in parallel or crosswise to form the carbon nanotube film structure.

6. The electrically modulated light source of claim 1, wherein the carbon nanotube film structure comprises a composite structure of at least one layer of super-aligned carbon nanotube film and a plurality of carbon nanotube wires.

7. The electrically modulated light source of claim 1, wherein in a temperature range of 800° C. to 1200° C. and in a visible to near-infrared band, a rise time to the highest temperature of the carbon nanotube film structure is 3 milliseconds to 4 milliseconds, and a fall time to the initial temperature of the carbon nanotube film structure is 600 microseconds to 1 millisecond.

8. The electrically modulated light source of claim 1, wherein in a temperature range of 800° C. to 1200° C., and in an infrared light band, a rise time of a temperature to the highest temperature of the carbon nanotube film structure is 2 milliseconds to 3 milliseconds, and a fall time to the initial temperature of the temperature of the carbon nanotube film structure is 5 milliseconds.

9. A non-dispersive infrared spectrum detection system comprising:
a vacuum chamber comprising a window;
a first window piece fixed at the window;
a gas chamber directly connected to the first window piece, wherein a side of the gas chamber at the first window piece is defined as a first side, and a side of the gas chamber opposite to the first side is defined as a second side;
a second window piece fixed on the second side;
a narrow bandpass filter;
a detector; and
an electrically modulated light source comprising a carbon nanotube film structure and isolated from a gas in the gas chamber, wherein the electrically modulated light source is capable of heating up to a highest temperature to emit a thermal radiation in less than 10 milliseconds after a voltage is applied, and the electrically modulated light source is capable of cooling down to an initial temperature of the electrically modulated light source in less than 10 milliseconds after the voltage is removed; and an modulation frequency of the electrically modulated light source is greater than or equal to 150 KHz,
wherein an optical signal radiated by the electrically modulated light source is detected by the detector after sequentially passing through the first window piece, the gas chamber, the second window piece, and the narrow bandpass filter.

10. The non-dispersive infrared spectrum detection system of claim 9, wherein the carbon nanotube film structure comprises a plurality of layers of super-aligned carbon nanotube films, and the plurality of layers of super-aligned carbon nanotube films are stacked with each other.

11. The non-dispersive infrared spectrum detection system of claim 10, wherein an intersection angle between carbon nanotubes in adjacent super-aligned carbon nanotube films is 90 degrees.

12. The non-dispersive infrared spectrum detection system of claim 9, wherein the carbon nanotube film structure comprises a plurality of carbon nanotube wires, and the plurality of carbon nanotube wires are arranged in parallel or crosswise to form the carbon nanotube film structure.

13. The non-dispersive infrared spectrum detection system of claim 9, wherein the carbon nanotube film structure comprises a composite structure of at least one layer of super-aligned carbon nanotube film and a plurality of carbon nanotube wires.

14. The non-dispersive infrared spectrum detection system of claim 9, wherein in a temperature range of 800° C. to 1200° C. and in a visible to near-infrared band, a rise time to the highest temperature of a temperature of the carbon nanotube film structure is 3 milliseconds to 4 milliseconds, and a fall time to the initial temperature of the temperature of the carbon nanotube film structure is 600 microseconds to 1 millisecond.

15. The non-dispersive infrared spectrum detection system of claim 9, wherein in a temperature range of 800° C. to 1200° C., and in an infrared light band, a rise time to the highest temperature of a temperature of the carbon nanotube film structure is 2 milliseconds to 3 milliseconds, and a fall time to the initial temperature of the temperature of the carbon nanotube film structure is 5 milliseconds.

16. The non-dispersive infrared spectrum detection system of claim 9, further comprising a lock-in amplifier, wherein a signal received on the detector is input to the lock-in amplifier.

17. A method for detecting gas, comprising:
step (S1): providing a non-dispersive infrared spectrum detection system comprising:
　a vacuum chamber comprising a window;
　a first window piece fixed at the window;
　a gas chamber directly connected to the first window piece, wherein a side of the gas chamber at the first window piece is defined as a first side, and a side of the gas chamber opposite to the first side is defined as a second side;
　a second window piece fixed on the second side;
　a narrow bandpass filter;
　a detector; and
　an electrically modulated light source comprising a carbon nanotube film structure and isolated from a gas in the gas chamber, wherein the electrically modulated light source is capable of heating up to a highest temperature to emit a thermal radiation in less than 10 milliseconds after a voltage is applied, and the electrically modulated light source is capable of cooling down to an initial temperature of the electrically modulated light source in less than 10 milliseconds after the voltage is removed; and an modulation frequency of the electrically modulated light source is greater than or equal to 150 KHz,
　wherein an optical signal radiated by the electrically modulated light source is detected by the detector after sequentially passing through the first window piece, the gas chamber, the second window piece, and the narrow bandpass filter;
step (S2): injecting a gas to be detected into the gas chamber; and
step (S3): applying a voltage to the electrically modulated light source, to make the electrically modulated light source emit thermal radiation, and a optical signal radiated by the electrically modulated light source is detected by the detector after sequentially passing through the first window piece, the gas chamber, the second window piece, and the narrow bandpass filter.

18. The method of 17, wherein step S3 further comprises a process of inputting an square wave pulse power signal to a lock-in amplifier as a reference signal, and inputting the optical signal detected by the detector to the lock-in amplifier.

19. The method of 17, wherein the gas to be measured is a single target gas or a mixed target gas.

20. The method of 17, wherein the gas to be measured is selected from a group consisting of $CO_2$, $CH_4$, $N_2O$, CO, $SO_2$, $NH_3$, ethanol, and benzene.

\* \* \* \* \*